US006368033B2

(12) United States Patent
Souders

(10) Patent No.: US 6,368,033 B2
(45) Date of Patent: Apr. 9, 2002

(54) RIGHT-ANGLE PLUNGE ROUTER

(76) Inventor: Steven Howell Souders, 304 Landis Rd., Hagerstown, MD (US) 21740

( * ) Notice: Subject to any disclaimer, the term of this patent is extended or adjusted under 35 U.S.C. 154(b) by 0 days.

(21) Appl. No.: 09/885,975

(22) Filed: Jun. 22, 2001

Related U.S. Application Data

(60) Provisional application No. 60/213,939, filed on Jun. 26, 2000.

(51) Int. Cl.[7] .............................. B23C 1/20; B27C 5/00; B27M 1/00

(52) U.S. Cl. ............... 409/182; 144/136.95; 144/154.5; 409/175; 409/218

(58) Field of Search ................................ 409/182, 181, 409/218, 180, 175; 144/136.95, 154.5

(56) References Cited

U.S. PATENT DOCUMENTS 4,347,450 A * 8/1982 Colligan ..................... 408/127
4,810,916 A * 3/1989 McBride ...................... 408/22
4,938,264 A * 7/1990 Ferenczffy ............. 144/136.95
5,207,253 A * 5/1993 Hoshino et al. ........ 409/182 X
5,657,804 A * 8/1997 Lee ......................... 144/154.5
5,706,874 A * 1/1998 Brazell et al. ........... 144/154.5
6,260,591 B1 * 7/2001 George .................. 144/136.95

FOREIGN PATENT DOCUMENTS

DE 3303734 * 8/1894 ............. 144/154.5
DE 8665 * 8/1956 ............. 144/154.5
EP 0571160 A * 11/1993 ............. 144/154.5

* cited by examiner

*Primary Examiner*—William Briggs

(57) ABSTRACT

A portable electric right-angle plunge router (10) is disclosed which has a pair of laterally spaced apart bases (13, 14), two pair of laterally spaced apart columns (12) and a motor housing assembly (11). The bases (13, 14) have planar work engaging surfaces (15). Affixed to the bases (13, 14) are the laterally spaced apart columns (12) which extend perpendicularly to the work engaging surfaces (15). The motor housing assembly (11) has a central axis which is parallel to the work surface and is mounted on the laterally spaced apart columns (12) to allow the housing assembly to move vertically toward and away from the bases. Laterally space apart column guides (17) affixed to the housing (11) are aligned and sized to slidingly engage the columns (12). A handle is formed in the housing (11) between the front and rear column guides (17). A drive motor affixed in the housing has an armature shaft which is rotatable about an axis being substantially the horizontal axis of the housing (11). An arbor (25) is affixed in the housing and oriented substantially perpendicular to the horizontal axis of the housing (11). A tool chuck (24) affixed to the arbor (25) receives a cutting tool (20). The arbor (25) and armature shaft are interconnected by meshed gears thereby providing for right-angular transmission of power to the cutting tool (20). A depth-of-cut gauge (35) and lock-down mechanism (37, 39) are provided.

12 Claims, 3 Drawing Sheets

RIGHT-ANGLE PLUNGE ROUTER

The present invention is the same invention that was briefly described in my provisional patent application No. 60/213,939 filed Jun. 26, 2000, Plunge Router.

BACKGROUND OF THE INVENTION

The present invention relates to hand-held plunge routers. More particularly, the invention relates to a hand-held, portable electric, right-angle plunge router capable of cutting work surfaces that are not accessible with conventional routers, prior plunge routers, or other cutting tools. One example is flooring material at or near the point where the flooring material abuts walls and cabinets. Another example is flooring material along the toekick of cabinets. Yet another example is work surfaces in comers.

Routing tools are well known in the art. Conventional routers are generally constructed with the motor housing and motor oriented along a vertical axis. A flat circular base plate is attached to the motor housing with its axis oriented perpendicular to the axis of the housing and motor. The motor drives a shaft which is oriented along the axis of the motor. A cutter secured to a tool chuck, which is secured to the motor shaft, extends through an opening in the center of the base plate. Some router designs allow the base plate to be pivoted to provide for angular cuts. In a prior design disclosed in U.S. Pat. No. 3,494,395 a router is designed with a vertically oriented arbor and a motor shaft oriented at some supplementary angle with respect to the vertical axis of the arbor. The arbor and motor shaft are interconnected by a pair of beveled gears fixed to the arbor and shaft respectively.

Plunge routers are also well known in the art. Plunge routers are generally constructed with the motor housing and motor oriented along a vertical axis and perpendicular to the axis of the base plate. A pair of laterally spaced, parallel columns fixed perpendicular to the base plate extend into column guides in the housing. A downward force on the housing moves the housing downward along the columns thereby moving the arbor and cutter downward through an opening in the center of the base plate and into the work surface. Examples of plunge routers are disclosed in U.S. Pat. Nos. 4,938,264; 5,207,253 and 5,310,296.

Right-angle hand held cutting tools and the means thereof for transmitting rotary motion between angularly displaced shafts are also generally known in the art. Examples are disclosed in U.S. Pat. Nos. 3,411,024; 4,347,450 and 4,810,916.

However, prior tools are unsuitable or incapable of cutting work surfaces in close proximity to other surfaces which abut and are perpendicular to the work surface, work surfaces in confined areas, or work surfaces in corners.

Therefore, it is an object of the present invention to provide a hand-held, portable electric, right-angle plunge router capable of cutting work surfaces in close proximity to other surfaces which abut and are perpendicular to the work surface, work surfaces in confined areas, and work surfaces in corners.

SUMMARY OF THE INVENTION

A portable electric, right-angle plunge router is disclosed which has a front and rear base, a plurality of laterally spaced columns, and a motor housing assembly. The front and rear bases are laterally displaced and each have a planar work engaging surface. Another embodiment could consist of a single large base plate with a planar work engaging surface; however, the preferred embodiment of the present disclosure consists of a pair of base plates. Affixed to each base are a pair of laterally spaced columns which extend perpendicular to the work engaging surface. The columns are covered with bellows to prevent dirtying of the columns.

The motor housing assembly is oriented with its central axis parallel to the work engaging surface. The motor housing assembly is translatably movable upon the columns relative to the bases to move a cutting tool into and out of engagement with the work surface. The motor housing assembly includes a housing and a drive motor for rotating the cutting tool, and four column guides. The drive motor, affixed to the housing, has an armature shaft rotatable about an axis which extends horizontal to the planar work engaging surface. Four column guides are affixed to the housing and are aligned and sized to slidingly engage the columns. A primary handle is formed in the housing between the front and rear column guides. A threaded sleeve is embedded in each side of the housing to allow a threaded auxiliary handle to be attached to either side of the housing. The plunge router also includes a depth-of-cut gauge, and a lock down mechanism to lock the router at the desired cutting depth.

DESCRIPTION OF THE PREFERRED EMBODIMENTS

Figure 1:
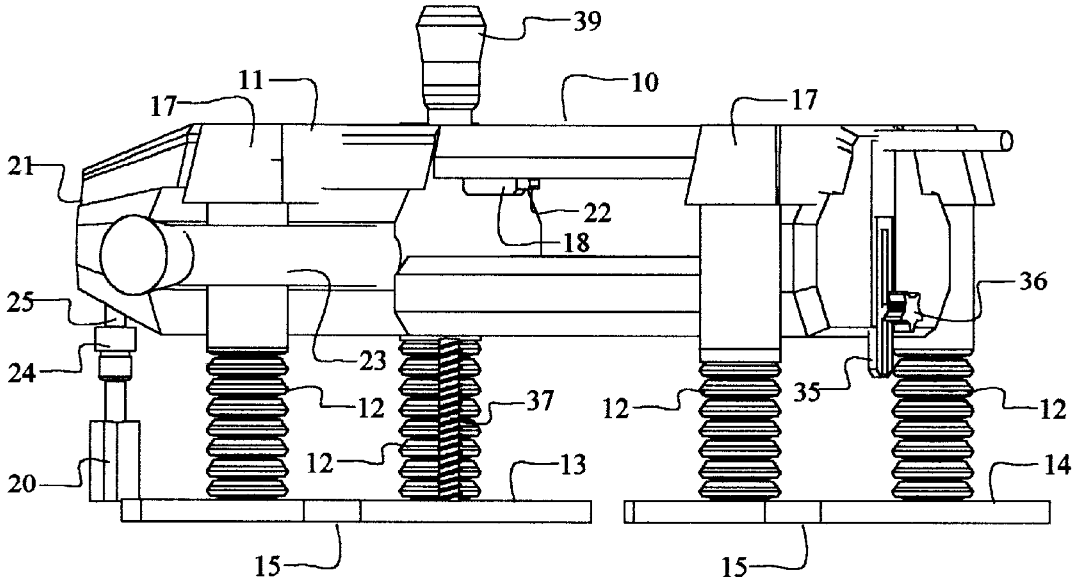
FIG. 1 is a perspective view of a plunge router in accordance with the present invention.

A portable electric, right-angle plunge router 10 shown in FIG. 1 includes a front base plate 13 and a rear base plate 14 which have planar work engaging surfaces 15. Another embodiment would comprise one large base plate with a planar work engaging surface. However, the preferred embodiment of this description consists of a pair of base plates. A plurality of laterally spaced columns 12 are affixed to the front base plate 13 and rear base plate 14 and extend perpendicularly away from the work engaging surface 15 of the base plates. The router housing 11 is mounted on said columns 12 for movement along a central vertical axis toward and away from the bases.

Figure 2:
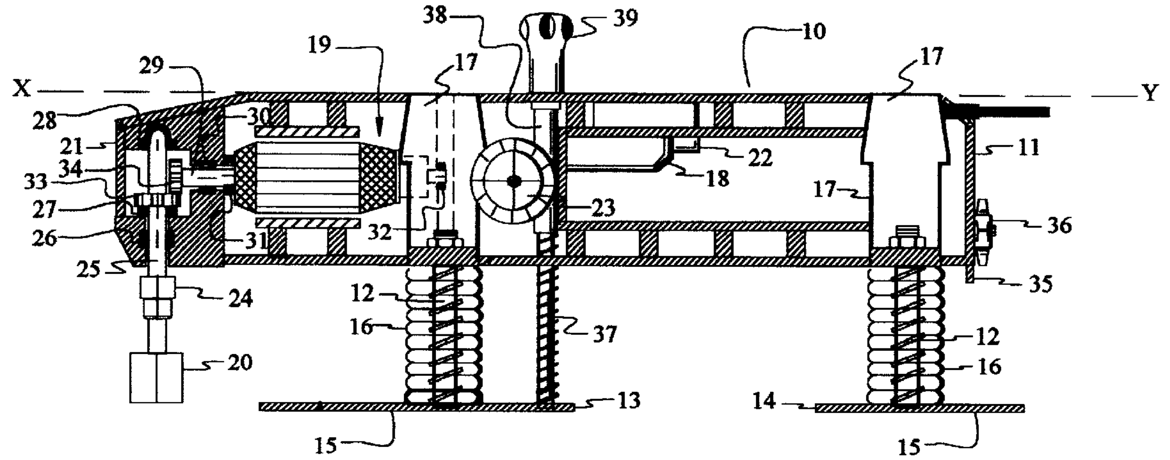
FIG. 2 is a cross-sectional view of the left side elevation of the plunge router

Referring to FIG. 2, the columns 12 are covered by bellows 16 and extend through front and rear column guides 17 which are part of the housing 11. A handle is formed by an opening in the housing 11 between the front and rear column guides 17. A trigger power switch 18 in the handle controls a motor 19 arranged in the housing. The motor 19 is arranged in the housing 11 in a manner to provide right-angular transmission of power to a cutting tool 20. For optimal cutting of the work surface, the diameter of the cutting tool 20 is such that the outer edge of the cutting tool is substantially vertically aligned with the front face 21 of the housing 11. A power lock-on switch 22 is provided to lock the power on while the router is in use. An auxiliary handle 23 is provided to facilitate convenient usage and control of the plunge router 10. The auxiliary handle 23 is threaded and can be attached to either side of the,housing 11 by means of internally threaded sleeves embedded in each side of the housing.

A cutting tool 20 is attached to a tool chuck 24 which is affixed to an arbor 25. The arbor 25 is journalled by spaced antifriction bearings 26, 27, and 28 in the housing 11. The arbor 25 is driven by an electric motor with an affixed armature shaft 29. The armature shaft 29 is journalled by spaced antifriction bearings 30, 31 and 32 in the housing. The arbor 25 and armature shaft 29 respectively, thereby providing for right-angular transmission of power directly from the armature shaft 29 to the arbor 25, thence to the cutting tool 20.

When a downward force is applied, the housing 11 travels downward along the columns 12 and the cutting tool 20 is plunged into the work surface. As the housing 11 travels downward, the columns 12 project into the column guides 17 which are part of the router housing 11. The depth of cut is controlled by an adjustable depth-of-cut gauge 35 affixed to the rear of the housing 11. The depth-of-cut gauge 35 consists of a guide on the housing 11 and a bar arranged displaceably in the vertical direction in the guide. A vertical slot is provided in the center of the depth-of-cut gauge bar. A threaded shaft on the clamping knob 36 passes through the slot in the depth-of-cut gauge bar and is threaded into an internally threaded grommet embedded in the housing 11. Calibrations are provided on the rear of the housing 11 and an indicating mark is provided on the depth-of-cut gauge bar. The desired depth of the cutting tool 20 is set by raising or lowering the depth-of-cut gauge bar until the indicating mark is aligned with the desired depth calibration. The depth-of-cut is then locked in position by tightening the clamping knob 36. The downward movement of the housing 11 and cutting tool 20 are stopped when the depth-of-cut gauge 35 contacts the rear base plate 14.

When the desired cutting depth is reached, the housing 11 can be locked-down with a lock-down mechanism The lock-down mechanism consists of a threaded rod 37, and an internally threaded shaft 38 affixed to a knob 39. The lock-down mechanism rod 37 is affixed to the front base plate 13 so that the rod is stationary and extends perpendicular to and away from the work engaging surface 15. The lock-down mechanism rod 37 and shaft 38 extend through the center of the housing 11. When the desired cutting depth is reached, the lock-down mechanism shaft 38 is turned down onto the lock-down mechanism rod 37 by turning the knob 39 until the housing 11 is locked into position at the desired cutting depth. The plunge router 10 is moved laterally along the work surface to effect cutting of the work surface.

Figure 3:
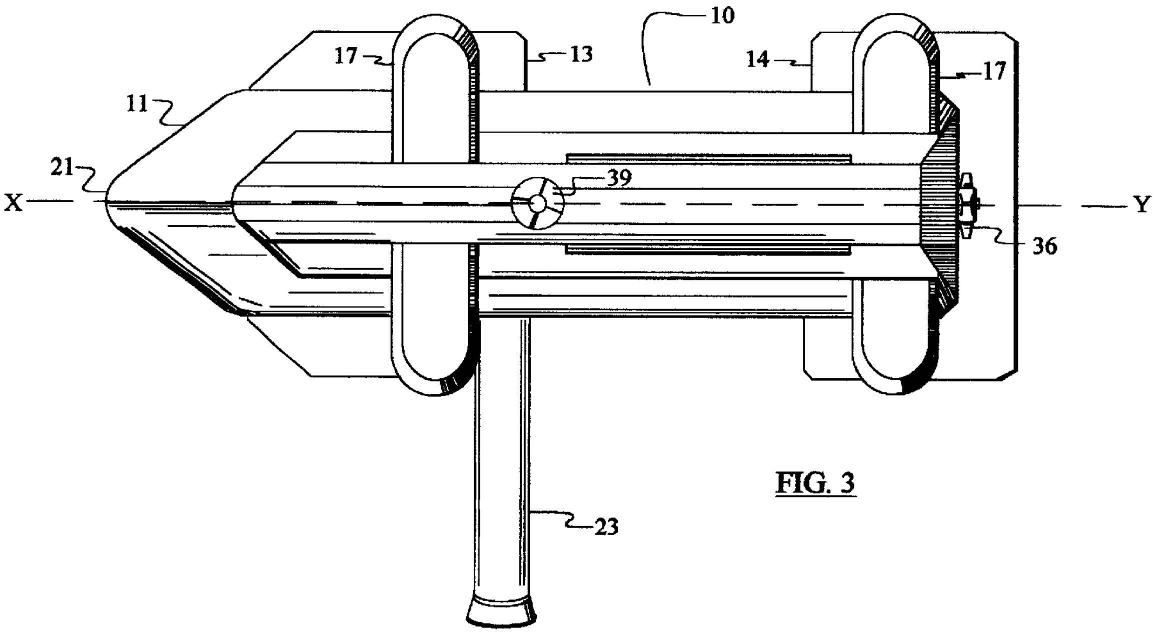
FIG. 3 is a plan view of the plunge router.
Figure 4:
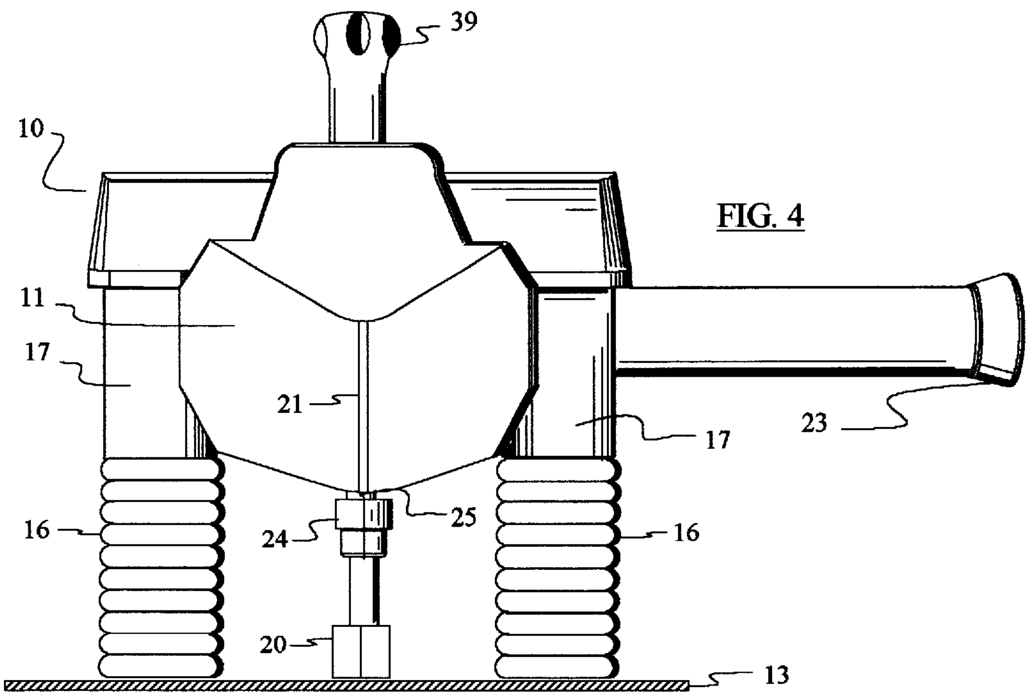
FIG. 4 is a front elevation view of the plunge router.

As shown in FIG. 3 and FIG. 4, the sides of the housing 11 are tapered inward at the front of the housing to form a narrow front face 21 to facilitate cutting of work surfaces in corners.

Figure 5:
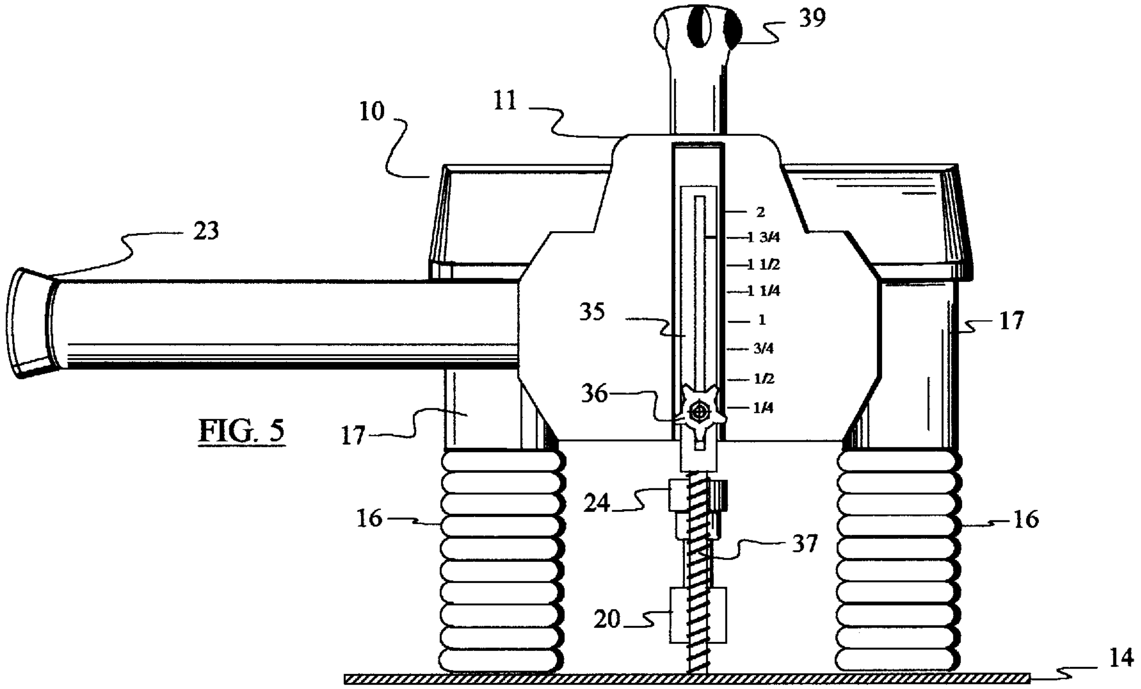
FIG. 5 is a rear elevation view of the plunge router.

As shown in FIG. 5, an adjustable depth-of-cut gauge 35 is affixed to the rear of the housing 11. The depth-of-cut gauge 29 consists of a guide on the housing 11 and a bar arranged displaceably in the vertical direction in the guide. The depth-of-cut gauge 29 is locked in position by a clamping knob 36. Calibrations are provided on the housing and an indicating mark is provided on the depth-of-cut gauge bar. The desired depth of the cutting tool 20 is set by raising or lowering the depth-of-cut gauge bar until the indicating mark is aligned with the desired depth calibration. The depth-of-cut is then locked in position by tightening the clamping knob 36.

I claim:

1. A portable, right-angle plunge router for cutting a work surface comprising:

(a) at least one base, said at least one base having a planar work engaging surface;

(b) a plurality a of laterally spaced apart columns affixed to said at least one base and extending perpendicularly away from the work engaging surface of said at least one base;

(c) a housing mounted on said columns for movement along a central axis toward and away from said at least one base;

(d) a plurality of laterally space apart column guides affixed to said housing, aligned and sized to slidingly engage said columns;

(e) a motor affixed in said housing having an armature shaft journalled in spaced apart bearings in the housing, and rotatable about a second axis generally transverse to said central axis;

(f) a driving gear on the forward end of said armature shaft;

(g) an arbor, journalled in spaced apart bearings in the housing, oriented substantially perpendicular to said second axis;

(h) a gear at the upper end of said arbor and engaging the drive gear on the armature shaft;

(i) a tool chuck affixed to the lower end of the arbor;

(j) a removable handle, attachable to either side of the housing;

(k) a depth-of-cut gauge whereby the cutting tool depth can be accurately set; and (l) a lock-down mechanism whereby the router can be locked down at the desired cutting depth.

2. The portable right-angle plunge router of claim 1 wherein said housing has a primary axis which is parallel to the work surface.

3. The portable right-angle plunge router of claim 1 wherein said at least one base is displaceable in a direction extending parallel to said second axis.

4. The portable right-angle plunge router of claim 1 wherein said arbor has an axis which is substantially perpendicular to said second axis.

5. The portable right-angle plunge router of claim 1 wherein said lock-down mechanism comprises:

a threaded rod affixed in a stationary manner to said at least one base and extends perpendicularly away from the work engaging surface of said at least one base; and further comprising an adjusting element.

6. The portable right-angle plunge router of claim 5 wherein said adjusting element is comprised of an internally threaded shaft affixed to a rotary knob.

7. A portable, right-angle plunge router comprising:

(a) at least one base, said at least one base having a planar work engaging surface;

(b) a plurality of laterally spaced apart columns affixed to said at least one base and extending perpendicularly away from the work engaging surface of said at least one base;

(c) a motor housing assembly mounted on said columns for movement along a central axis toward and away from said at least one base;

said motor housing assembly including:

a plurality of laterally space apart column guides affixed to said housing, aligned and sized to slidingly engage said columns;

a drive motor affixed in said housing having:

an armature shaft journalled in spaced apart bearings in the housing, said armature shaft rotatable about a first axis being substantially a primary axis of the housing;

tool chuck driven by said motor about a second axis generally perpendicular to said first axis;

a primary handle formed in housing;

a plurality of switches disposed on said primary handle;

a removable threaded handle attachable to either side of the housing;

a depth-of-cut gauge whereby the cutting tool depth can be accurately set.

8. The portable right-angle plunge router of claim 7 wherein the sides of the said housing are tapered inward at the front of the housing to form a narrow front face.

9. The portable right-angle plunge router of claim 7 wherein said primary handle is formed in the housing between the front and rear column guides.

10. The portable right-angle plunge router of claim 7 wherein the said switches disposed on the primary handle comprise:

a trigger power switch, and a power lock-on switch.

11. The portable right-angle plunge router of claim 7 wherein an internally threaded sleeve is provided on the left and right sides of the housing to accept said removable threaded handle.

12. The portable right-angle plunge router of claim 7 wherein said depth-of-cut gauge comprises:

a guide on the housing, a bar arranged displaceably in the vertical direction in said guide and having an indication mark, and a clamping knob.

* * * * *

UNITED STATES PATENT AND TRADEMARK OFFICE

CERTIFICATE OF CORRECTION

PATENT NO. : 6,368,033 B2
DATED : April 9, 2002
INVENTOR(S) : Steven Howell Souders It is certified that error appears in the above-identified patent and that said Letters Patent is hereby corrected as shown below:

Column 1,
Line 16 which reads “example is work surfaces in comers” should read -- example is work surfaces in corners. --

Column 3,
Lines 7-10, which read “The arbor 25 and armature shaft respectively, thereby providing for right-angular transmission of power directly from the armature shaft 29 to the arbor 25, thence to the cutting tool 20.” should read -- The arbor 25 and armature shaft 29 are interconnected by meshed gears 33 and 34 affixed to the arbor 25 and the armature shaft 29 respectively, thereby providing for right-angular transmission of power directly from the armature shaft 29 to the arbor 25, thence to the cutting tool 20. --

Column 5,
Line 1, which reads “tool chuck driven by said motor about a second axis.” should read -- a tool chuck driven by said motor about a second axis. --

Signed and Sealed this

Twenty-seventh Day of August, 2002

*Attest:*

JAMES E. ROGAN

*Attesting Officer* *Director of the United States Patent and Trademark Office*